Aug. 23, 1927.
F. PORSCHE
1,639,784
CHARGING DEVICE FOR COMBUSTION MACHINES
Filed Jan. 14, 1925
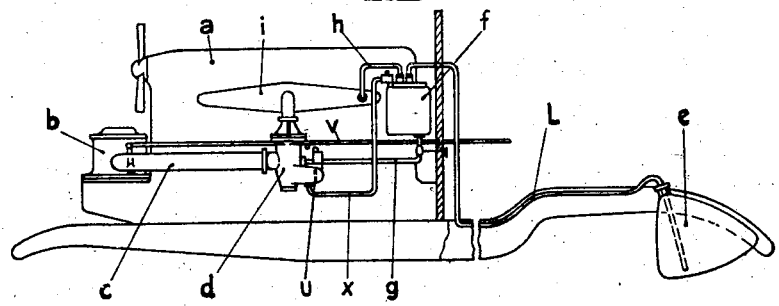
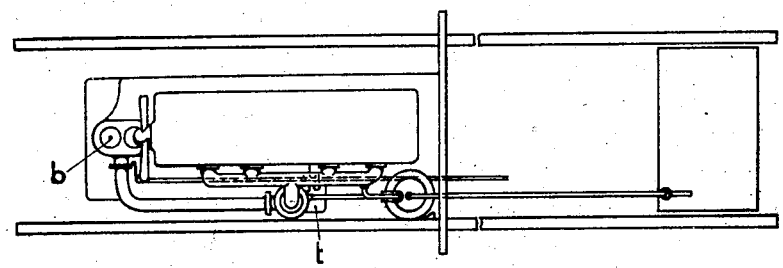
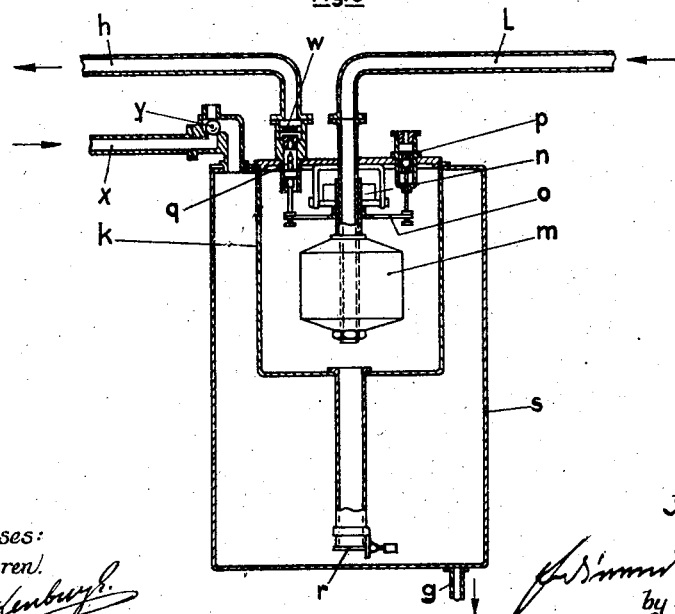
Witnesses:
Inventor:

Patented Aug. 23, 1927.

1,639,784

UNITED STATES PATENT OFFICE.

FERDINAND PORSCHE, OF STUTTGART-UNTERTURKHEIM, GERMANY, ASSIGNOR, BY MESNE ASSIGNMENTS, TO DAIMLER-BENZ AKTIENGESELLSCHAFT, OF BERLIN, GERMANY.

CHARGING DEVICE FOR COMBUSTION MACHINES.

Application filed January 14, 1925, Serial No. 2,458, and in Germany April 30, 1923.

The present invention relates to combustion engines with which the fuel tank is situated lower than the carburettor. In such case it is necessary, in order to cause the fuel to flow from the tank to the carburettor, either to produce an over-pressure in the fuel tank (which must suitably be constructed for this purpose) and fitted with an air pump, or to arrange a suction apparatus between the tank and the carburettor.

If the said combustion engines, the fuel tanks of which are situated below the carburettor, are fitted out with a blower for the purpose of delivering air under overpressure to the motor, for the purpose of supercharging same for a short time, it is obvious that during this period of supercharging, the motor and carburettor are being put under over-pressure. Consequently the normal delivery of fuel from the low tank to the carburettor is in such case no longer possible.

For the purpose of over-pressure fuel conduction from main tank to carburettor, constructions have been provided, by which a continuous fuel supply to the carburettor during the overload period was secured. Over-pressure fuel conduction, however, has the drawback that the main fuel tank must be constructed according to the over-pressure therein and this leads to a main tank of considerable weight.

Up to now no construction has been suggested by which a continuous fuel supply to the carburettor, whilst overloading, was secured in connection with a machine the main fuel tank with which is situated lower than the carburettor and whereby the fuel transport from main tank to carburettor is operated by a suction apparatus.

The object of the present invention is to secure a continuous fuel supply to the motor, during the period of supercharging, in connection with a combustion engine, the main fuel tank of which is situated lower than the carburettor and whereby the transport of the fuel from the main tank to the carburettor is operated by a suction apparatus.

Another object of the present invention is that the arrangement which is provided for securing a continuous fuel delivery during the supercharging period, is put in action automatically, as soon as the overloading compressor delivers air under overpressure; and further that whilst supercharging, no fuel is taken from the main tank.

An example of carrying this invention into effect is represented in the accompanying drawing, of which Fig. 1 shows in a section a vehicle frame together with the motor and the conveyer or suction device according to this invention, Fig. 2 is a plan view of the same and Fig. 3 shows in an enlarged scale the suction device for the fuel.

According to the present invention an auxiliary fuel container $s$ has been provided for, in the fuel conduit $l$, between main tank $e$ and carburettor $d$.

This auxiliary fuel container $s$ is situated above the level of the carburettor $d$. When supercharging the auxiliary fuel container $s$ is put under the same over-pressure as the carburettor $d$ and according to the high position of the former, the fuel contained therein flows to the carburettor $d$ by reason of its own weight.

It will be understood that the length of the supercharging period depends on the capacity of the auxiliary fuel container $s$, that is to say of the quantity of fuel this tank can contain.

According to the object of the present invention this auxiliary fuel container $s$ is automatically put under atmospheric pressure as soon as the overload period is at an end, that is to say when the overloading compressor $b$ no longer delivers air under over-pressure into the admission chamber $i$ of the motor $a$.

In order to put the auxiliary container $s$ under over-pressure, whilst overloading, and to put it under atmospheric pressure whilst running under normal conditions, the following means are provided. A three way connection is made between the top of the auxiliary container $s$, the carburettor $d$ of the motor $a$ and the atmosphere.

In the three way connection a valve $y$ is provided which under conditions of normal load puts the auxiliary container $s$ in connection with the atmosphere and shuts it off from the carburettor $d$ of the motor $a$. Incidentally when during the period of supercharging the compressor $b$ puts the admission chamber $i$ and the carburettor $d$ of the motor under over-pressure, this valve $y$ links the container $s$ to the carburettor $d$, thus putting the former under the pressure of the latter and shutting it off from the atmosphere.

The suction apparatus consists of a suction chamber $k$ which communicates with the main tank $e$ by an open fuel transmission pipe, $l$, and by means of a suction pipe $h$ and valve $w$ with the admission chamber $i$ of the motor $a$.

The suction chamber $k$ which is situated above the auxiliary container $s$ communicates with the latter by a fuel admission pipe provided with a check valve $r$.

Under conditions of normal load, the fuel, which operated by the suction apparatus $f$, has been transmitted from the main fuel tank $e$ to the suction chamber $k$, drops from the suction chamber through the fuel pipe and check valve $r$ into the auxiliary container $s$ and by reason of its proper weight, flows from the auxiliary container to the carburettor $d$.

If, when running under normal load, incidentally the auxiliary container $s$ and the suction chamber $k$ becomes filled with fuel, a float $m$ shuts the suction valve $w$ in the suction pipe $h$ of the suction chamber $k$ and at the same time opens a valve $p$, which admits atmospheric pressure into the suction chamber $k$, thus cutting off the operation of the suction apparatus $f$.

It is obvious that to prevent loss of fuel, the connection of the auxiliary container $s$ with the atmosphere must be situated above the fuel level tolerated by the float $m$ in the suction chamber $k$.

When supercharging, the auxiliary container $s$ is put under the over-pressure of the carburettor $d$ of the motor, in the manner as described above. Due to the over-pressure in the container $s$, the check valve $r$ in the connection pipe of suction chamber $k$ and container $s$ is closed and thus the container $s$ is shut off from the suction chamber $k$. By reason of its proper weight the fuel stored in the auxiliary container $s$ continues to flow to the carburettor $d$, which with the container $s$ by means of the blower $b$ is put under the same over-pressure as the admission chamber $i$.

Simultaneously herewith the suction pipe $h$ of the suction chamber $k$ and which pipe $h$ is corresponding with the admission chamber $i$ of the motor $a$, is put under over-pressure, causing the valve $w$ arranged in the suction pipe $h$ to close and thus to cut off the operation of the suction apparatus $f$. During the supercharging period no fuel is transmitted from the main tank $e$ to the suction chamber $k$.

It is a characteristic feature of the present invention:

1. That during the period of supercharging, the auxiliary container $s$ is put under the over-pressure of the admission chamber $i$, shutting thereby off said auxiliary container $s$ from the suction chamber $k$;
2. That the fuel supply to the carburettor $d$ is continued from the container $s$ and;
3. That at the same time the operation of the suction apparatus $f$ is cut off.

I claim :—

A fuel feeding system for that type of auto vehicle construction in which the main fuel reservior is lower than the carburettor of the engine and in which the normal vacuum in the intake manifold is intermittently changed to over-pressure by the use of a supercharger, comprising, a vacuum tank communicating with a main fuel reservoir, an auxiliary tank communicating with the carburettor of the engine, said auxiliary tank being in one-way communication with said vacuum tank to receive fuel from the latter, a conduit connecting said vacuum tank with a region of the engine in which the normal vacuum alternates with over-pressure from the supercharger when the latter is operated, a conduit connecting said auxiliary tank with a region of the engine subject to over-pressure of the supercharger, and a check valve in said first named conduit operative upon the simultaneous application of over-pressure to both said conduits, to close said first named conduit against communication with the main fuel reservoir.

In testimony whereof I affix my signature.

FERDINAND PORSCHE.